(12) United States Patent
Tomasi et al.

(10) Patent No.: US 6,330,234 B1
(45) Date of Patent: Dec. 11, 2001

(54) METHOD AND APPARATUS FOR REDUCING CURRENT CONSUMPTION

(76) Inventors: Peter A. Tomasi, 618 Linden Ave., Elmhurst, IL (US) 60126; Tong Zhao, 1635 Westbury Dr., Hoffman Estates, IL (US) 60195; Lindo St. Angel, 207 E. Parallel St.; Michael J. Schellinger, 1082 N. Cardinal Dr., both of Palatine, IL (US) 60067; Dien N. Nguyen, 4511 Amber Ave., Cortland, IL (US) 60112; Wayne H. Bradley, 601 Meadowview Dr., West Chicago, IL (US) 60185

( * ) Notice: Subject to any disclaimer, the term of this patent is extended or adjusted under 35 U.S.C. 154(b) by 0 days.

(21) Appl. No.: 09/559,675

(22) Filed: Apr. 27, 2000

(51) Int. Cl.[7] ............................... H04J 3/06; H04B 7/216
(52) U.S. Cl. ..................... 370/342; 370/441; 370/515; 455/574
(58) Field of Search ...................... 370/311, 324, 370/350, 335, 342, 503, 510, 320, 336, 333, 329, 328, 515, 441; 455/574

(56) References Cited

U.S. PATENT DOCUMENTS

| | | | |
|---|---|---|---|
| 5,392,287 | * | 2/1995 | Tiedemann, Jr. et al. ............ 370/311 |
| 5,539,730 | * | 7/1996 | Dent ..................................... 370/280 |
| 5,666,355 | * | 9/1997 | Huah et al. ........................... 370/311 |
| 5,708,658 | * | 1/1998 | Sugita .................................. 370/335 |
| 5,884,196 | * | 3/1999 | Lekven et al. ....................... 370/311 |
| 6,016,312 | * | 1/2000 | Storm et al. ......................... 370/311 |
| 6,069,880 | * | 5/2000 | Owen et al. ......................... 370/311 |
| 6,072,987 | * | 6/2000 | Willey ................................. 370/311 |
| 6,101,173 | * | 8/2000 | Bayley ................................ 370/311 |
| 6,195,573 | * | 2/2001 | Cassidy et al. ..................... 455/574 |

OTHER PUBLICATIONS

Ross, Linear Feedback Shift Registers, *CDMA Development Group website article*, www.cdg.org/tech/a ross/LFSR.html, pp. 1–3 (1996).

St. Angel, CDMA Phone Standby Time Calls for Critical Design Decisions, *Wireless Systems Design*, pp. 20–28 (Feb. 1999).

\* cited by examiner

*Primary Examiner*—Ajit Patel
*Assistant Examiner*—Hanh Nguyen
(74) *Attorney, Agent, or Firm*—Marshall, Gerstein, & Borun

(57) ABSTRACT

A method and apparatus reduces current consumption of a mobile communication unit, such as a cellular or mobile telephone that communicates with a base station by disabling a temperature controlled crystal oscillator and a code generator while the mobile communication unit is in a sleep mode of operation, thereby reducing the sleep mode current consumed by the mobile communication unit. Prior to entering sleep mode, the mobile communications unit stores the state of the code generator and disables the temperature controlled crystal oscillator. Upon waking from sleep mode, the mobile communication unit calculates what the state of its code generator would have been if its temperature controlled crystal oscillator had not been disabled, and uses this calculated state to achieve synchronization with a code generator in the base station.

34 Claims, 10 Drawing Sheets

METHOD AND APPARATUS FOR REDUCING CURRENT CONSUMPTION

TECHNICAL FIELD

The present invention is directed to communication systems and, more particularly, to a method and apparatus for reducing current consumption in a communication system mobile unit.

BACKGROUND ART

Communication systems, such as cellular systems (both time division multiple access (TDMA) and code division multiple access (CDMA) cellular systems) and personal communication systems (PCS), typically include mobile units and infrastructure, such as base stations, with which the mobile units communicate. The infrastructure links the mobile units to a land line telephone system such as, for example, a point switched telephone network (PSTN) to enable mobile unit users to communicate with land line users. For example, when a mobile unit user places a call to a person at a land line telephone, the infrastructure connects the mobile unit to the land line.

Typically, mobile units are compact and battery powered so that they are easily transportable. For example, a user may carry a mobile unit in her purse, pocket, briefcase or car. While mobile units may have access to external power sources in some situations (e.g., in a car through the use of a lighter adapter), mobile units do not always have access to power other than their own self contained batteries. In a typical use, a user may charge the battery of her mobile unit over the weekend and, on Monday morning, may turn the mobile unit on and put it in her purse. Thereafter, the user may not recharge the battery until the mobile unit gives her a low battery indication. When the mobile unit is turned on and the user is not using the mobile unit for a call, the mobile unit is in standby. While in standby, a mobile unit cycles through a number of operating modes. For example, while in standby, a mobile unit may cycle through or between a sleep mode that draws very little current, various setup and power up modes that draw more current than the sleep mode and a full receive mode, wherein the mobile unit's receiver is fully powered up and is looking for communications, such as pages, from the infrastructure. In standby, the mobile unit occasionally looks for communication signals from the infrastructure, which would alert the mobile unit that the infrastructure is passing a call to the mobile unit. Standby is one of the most common operating modes for a mobile unit and commonly mobile unit manufacturers specify the standby battery life of their mobile units for a particular battery size.

Because standby is one of the most common modes of mobile unit operation, it will be readily appreciated that battery life in standby is a critical mobile unit feature. Battery life in standby mode is inversely proportional to the current that a mobile unit draws from its battery during standby operation. With the goal of extending standby times as far as possible, various semiconductor and mobile unit manufacturers have developed electrical components (e.g., chip sets or semiconductors) having various sections of circuitry that may be independently powered down. Such components allow, for example, transmitter circuitry, which is not needed in standby, to be powered down, thereby reducing the current consumption of the mobile unit by the amount of current saved by powering down the transmitter circuitry.

SUMMARY OF THE INVENTION

The invention disclosed herein reduces current consumption of a mobile communication unit, such as a cellular or mobile telephone that communicates with a base station, by disabling a temperature controlled crystal oscillator and code generators of the mobile unit while the mobile communication unit is in a sleep mode of operation, thereby reducing the sleep mode current consumed by the mobile communication unit. Prior to entering sleep mode, the mobile communications unit stores the state of the code generators and disables the temperature controlled crystal oscillator. Upon waking from sleep mode, the mobile communication unit calculates what the states of its code generators would have been if its temperature controlled crystal oscillator had not been disabled, and uses these calculated states to achieve synchronization with a code generator or code generators in the base station. Additionally, when a mobile unit designed in accordance with the teachings disclosed herein attempts to synchronize to a base station, the PN space that the mobile unit must search is reduced, thereby reducing the amount of current needed to awaken the mobile unit from sleep mode. Furthermore, a mobile unit designed in accordance with the teachings disclosed herein need not listen to an entire paging slot to determine whether the mobile unit is being paged by a base station.

In one embodiment, the present invention is a method of reducing current consumption in a mobile communication unit having an oscillator driving a first code generator, wherein the mobile communication unit is adapted to communicate with a base station having a second code generator. The method may include the steps of storing a first state of the first code generator that is substantially synchronized to the second code generator at a first time, entering a sleep mode for a predetermined period of time during which the oscillator and the first code generator are stopped, entering an awake mode wherein the oscillator and the first code generator are started and calculating a second state of the first code generator that is substantially synchronized to the second code generator at a second time, wherein the second state of the first code generator is calculated based on the first state of the first code generator.

The method may also include the step of updating the first code generator to the second state, thereby substantially synchronizing the first code generator with the second code generator at the second time.

In some embodiments, the step of calculating the second state of the first code generator includes multiplying the first state by a transformation matrix. Additionally, the method may also include the step of determining an estimated error between the second state of the first code generator and a state of the second code generator at the second time.

In some embodiments, the method may include the step of searching a range of PN states dependent on the estimated error between the second state of the first code generator and the state of the second code generator at the second time to synchronize the first code generator to the second code generator.

In some embodiments, the step of entering the sleep mode for the predetermined period of time may include entering the sleep mode for approximately 1.28 seconds or approximately 2.56 seconds.

The step of searching a range of PN states depending on the estimated error may include searching a range two times the estimated error. Further, the step of entering the awake mode may include entering the awake mode for approximately 20 milliseconds to determine if a page is received from the base station. Additionally, the method may include the step of returning to the sleep mode if no page is received from the base station at the mobile unit.

In a second embodiment, the present invention may be a current consumption reduction system for use in a mobile communication unit having a processor and an oscillator driving a first code generator, wherein the mobile communication unit is adapted to communicate with a base station having a second code generator. The current consumption reduction system may include a memory, instructions stored by the memory and adapted for execution by the processor, wherein the execution of the instructions causes the processor to perform various steps. The steps may include storing a first state of the first code generator that is substantially synchronized to the second code generator at a first time, entering a sleep mode for a predetermined period of time during which the oscillator and the first code generator are stopped, entering an awake mode wherein the oscillator and the first code generator are started and calculating a second state of the first code generator that is substantially synchronized to the second code generator at a second time, wherein the second state of the first code generator is calculated based on the first state of the first code generator.

In a third embodiment, the present invention may be a current consumption reduction system for use in a mobile communication unit having an oscillator driving a first code generator, wherein the mobile communication unit is adapted to communicate with a base station having a second code generator. The current consumption reduction system may include a logic device programmed to perform various steps. The steps may include storing a first state of the first code generator that is substantially synchronized to the second code generator at a first time, entering a sleep mode for a predetermined period of time during which the oscillator and the first code generator are stopped, entering an awake mode wherein the oscillator and the first code generator are started and calculating a second state of the first code generator that is substantially synchronized to the second code generator at a second time, wherein the second state of the first code generator is calculated based on the first state of the first code generator.

These and other features of the present invention will be apparent to those of ordinary skill in the art in view of the description of the preferred embodiments, which is made with reference to the drawings, a brief description of which is provided below.

DESCRIPTION OF THE PREFERRED EMBODIMENTS

Although, designers and manufacturers have taken great strides to reduce standby current consumption and to thereby increase standby times of mobile units, some sections of mobile unit circuitry have not heretofore been powered down during sleep mode because these sections of circuitry maintain critical timing parameters needed for communication. As described below, a CDMA system, or any other system that uses slotting paging, includes a mobile unit having an oscillator that drives a long code generator that generates a 42-bit pseudorandom noise (PN) code, which is used by the mobile unit to receive communications from a base station. Additionally, the oscillator may drive a short code generator that produces a 15-bit PN code that uniquely identifies a base station with which the mobile unit is communicating. The code generators (both the long code generator and the short code generator) in the mobile unit must be synchronized in time to long and short code generators in a base station with which the mobile unit is communicating for the mobile unit to receive communications from the base station.

Heretofore, the oscillator driving the code generators in the mobile unit has not been powered down while the mobile unit is in sleep mode. Accordingly, forgoing mobile units have been unable to realize the current savings and the attendant extended standby times associated with powering down the oscillator that drives the code generators. As will be described hereinafter, the disclosed system, among other things, enables powering down the oscillator that drives the code generators, while still enabling the mobile unit to receive communications during its assigned paging slot. The following description of mobile unit operation highlights standby operation, it being understood that operating modes in which the mobile unit and a base station exchange audio information are substantially identical to those modes as they currently exist in the art.

As disclosed herein, additional current drain savings may be obtained by adaptively adjusting the PN search space that the mobile unit searches when the mobile unit attempts to synchronize with a base station. Additionally, while a paging slot may be 80 milliseconds (ms) in length, the system disclosed herein does not need to monitor the entire paging slot to determine whether a base station is paging the mobile unit. Rather, the system disclosed herein only examines approximately the first 20 ms of a paging slot before either powering up the mobile unit to engage in communications with the base station or going back into sleep mode. Accordingly, because the decision to return to sleep mode is made at 20 ms, rather than at 80 ms, the mobile unit can return to sleep sooner and therefore can realize the attendant current savings associated with sleep mode for an extra 60 ms over systems that must monitor the entire 80 ms paging slot to determine if a base station is paging the mobile unit.

Figure 1:
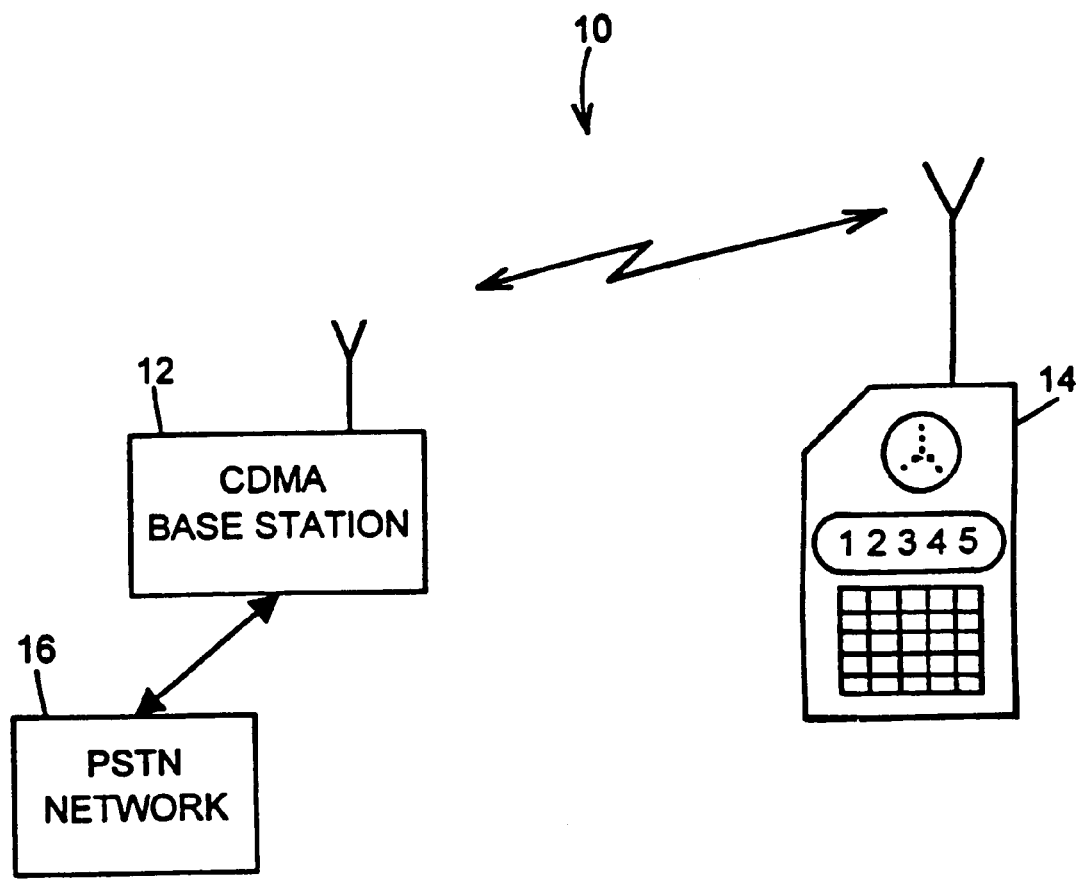
FIG. 1 is a block diagram of a CDMA communication system.

Turning now to the figures, FIG. 1 illustrates a communication system 10 having a CDMA base station 12 adapted to communicate with a mobile unit 14 and a PSTN 16. While numerous other mobile units may be used in a CDMA system, the following description addresses the operation of a single mobile unit 14. As will be readily appreciated by those having ordinary skill in the art, the CDMA base station 12 may be embodied in a digital cellular base station or a PCS base station. Either way, the CDMA base station 12 performs the function of relaying information between the mobile unit 14 and the PSTN 16.

The mobile unit 14, may be any communication device such as, for example, a mobile telephone that is adapted to communicate with the CDMA base station 12 using a slotted paging communication protocol such as the Electronic Industries Alliance/Telecommunications Industry Association (EIA/TIA) IS-95 protocol or the EIA/TIA IS-2000 protocol. In particular, the mobile unit 14 may be embodied in a digital cellular telephone or a PCS telephone, either of which may be adapted to communicate using either of the IS-95 or IS-2000 protocols. Further detail regarding the IS-95 protocol and the IS-2000 protocol is available in either the EIA/TIA IS-95 specification or the EIA/TIA IS-2000 specification, either of which is available from the Telecommunications Industry Association, Standards and Technology Department. The contents of the EIA/TIA IS-95 and IS-2000 specifications are hereby expressly incorporated by reference herein.

Slotted paging allows the CDMA base station 12 to alert the mobile unit 14 that the CDMA base station 12 has a call for the mobile unit 14. A paging slot is a periodically occurring portion of time assigned to the mobile unit 14 when the mobile unit 14 registers with the CDMA base station 12. When the CDMA base station 12 has a message for the mobile unit 14, the CDMA base station 12 sends a message to the mobile unit 14 during the paging slot assigned to the mobile unit 14. For example, when a person places a call to the mobile unit 14, the CDMA base station 12 alerts the mobile unit 14 of the incoming call by signaling to the mobile unit 14 on the paging slot preassigned to the mobile unit. As will be appreciated by those having ordinary skill in art, the CDMA base station 12 sends a number of different fields of data during a paging slot, the first of such fields allows the mobile unit 14 to detect that a page is present in the paging slot. A distinct advantage provided by slotted paging is that the mobile unit 14 in standby is aware of the temporal location of its paging slot and, therefore, need only be powered up to receive communication from the CDMA base station 12 during its paging slot. During the period of standby when the mobile unit 14 is in sleep mode, the receiver of the mobile unit 14 may be powered down (put to sleep).

In a slotted paging communication system, such as a system compliant with either of the IS-95 or IS-2000 communication protocols, paging slots may be 80 ms long and may periodically occur according to 1.28 seconds $(s) \times 2^i$, where i is a slot cycle index that is an integer between zero and seven, and is typically between zero and two. When a mobile unit 14 registers with the CDMA base station 12, the CDMA base station 12 assigns a slot cycle index to the mobile unit 14. A particular 80 ms paging slot may periodically occur at periods between 1.28 s and 163.84 s, and typically at periods of 1.28 s or 5.12 s. Typically, however, paging slots may have a period of 1.28 s or 2.56 s. For example, when a slot cycle index of one is assigned to the mobile unit 14, the mobile unit 14 must be "awake" and ready to receive paging information every 1.28 s. The balance of the 1.28 s when the mobile unit 14 is not expecting a page, the mobile unit 14 may sleep in a low current drain state that uses as little power as possible.

Figure 2:
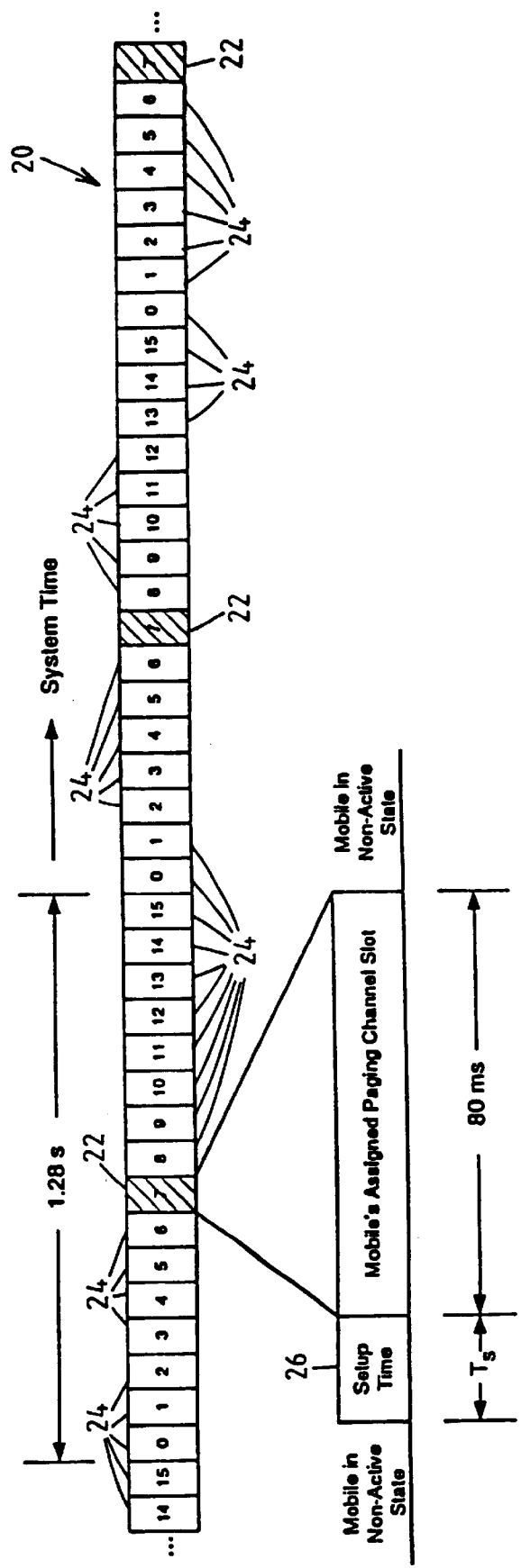
FIG. 2 is an illustration of a slotted paging mode structure that may be used in the CDMA communication system of FIG. 1.

Referring to FIG. 2, a slotted paging structure 20 corresponding to a slot cycle index of one (i.e., having a period of 1.28 s) has sixteen 80 ms paging slots numbered 0–15. In such a paging structure 20, the mobile unit 14 has assigned 80 ms paging slots 22 that occur every 1.28 s. Any slot that is not one of the assigned paging slots 22 is an unassigned paging slot 24. At the beginning of the assigned paging slots 22, the mobile unit 14 must have its receiver enabled and must have its short and long code generators synchronized to the code generators in the CDMA base station 12, such that if the CDMA base station 12 sends a page to the mobile unit 14, the mobile unit 14 will receive the page. Conversely, during the unassigned paging slots 24, the mobile unit 14 need not be ready to receive communication from the CDMA base station 12. FIG. 2 illustrates additional detail of one particular assigned paging slot 22 wherein a setup time (Ts) 26, which takes place in an unassigned paging slot 24 occurring before the assigned paging slot 22, is shown. The setup time 26 is the time required for the mobile unit 14 to become able to receive paging information as soon as the 80 ms assigned paging slot 22 begins. During the setup time 26, the mobile unit 14 may perform various functions such as tuning its receiver to an appropriate frequency, waiting for oscillators to stabilize or, as will be discussed hereinafter, synchronizing its short and long generators to the code generators in the CDMA base station 12.

Figure 3:
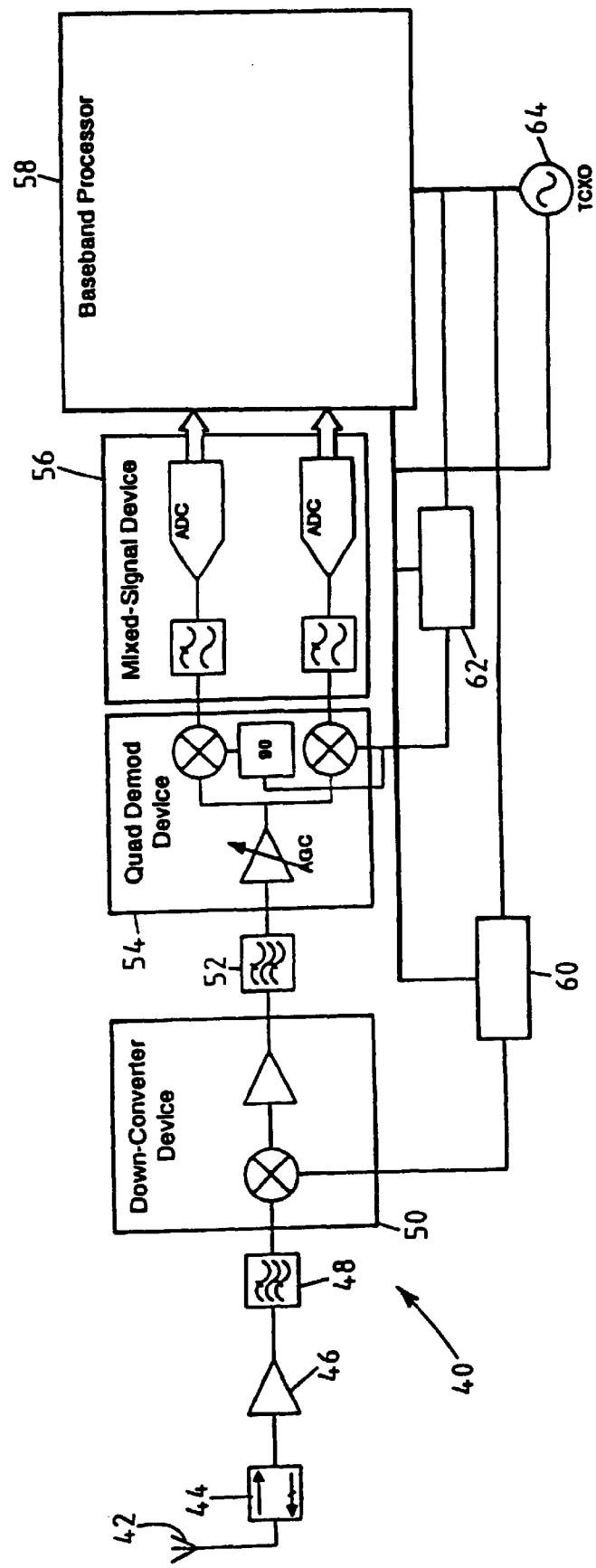
FIG. 3 is a block diagram of a CDMA receiver that may be used in the mobile unit of FIG. 1.

As illustrated in FIG. 3, a CDMA receiver 40, which is merely one example of a slotted paging receiver, may include an antenna 42, a diplexer 44, a low noise amplifier (LNA) 46, a first filter 48, a down converter 50, a second filter 52, a demodulator 54, a mixed signal device 56 and a baseband processor 58. Supporting components of the CDMA receiver 40 may include an ultra high frequency (UHF) synthesizer 60, a very high frequency (VHF) synthesizer 62 and a temperature controlled crystal oscillator (TCXO) 64. Of particular interest is the TCXO 64, which may be selectively enabled and disabled by the baseband processor 58 based on whether the CDMA receiver 40 is in an assigned paging slot 22 or an unassigned paging slot 24. The selective disabling of the TCXO 64 enables the mobile unit 14 to realize substantial standby current savings and extended battery life.

As will be appreciated by those having ordinary skill in the art, the antenna 42 may receive radio frequency (RF) signals from the CDMA base station 12 and may couple the received signals to the diplexer 44. From the diplexer 44, the received signals are amplified by the LNA 46, filtered by the first filter 48 and presented to the down converter 50. The down converter 50 receives a UHF signal from the UHF synthesizer 60 and down converts the received signal to an intermediate frequency signal, which is subsequently filtered by the second filter 52. The output of the second filter 52, is coupled to the demodulator 54 that, in a known manner, generates both in-phase and quadrature components of the downconverted signal through the use of a VHF signal provided by the VHF synthesizer 62. Both the UHF synthesizer 60 and the VHF synthesizer 62 operate based on the TCXO 64, which is enabled during the assigned paging slots 22 and disabled during unassigned paging slots 24. The in-phase and quadrature components are coupled from the demodulator 54 to the mixed signal device 56, which uses analog-to-digital converters (ADC) to convert the in-phase and quadrature components of the downconverted signal from an analog signal to one or more digital bitstreams that are coupled to the baseband processor 58.

Figure 4:
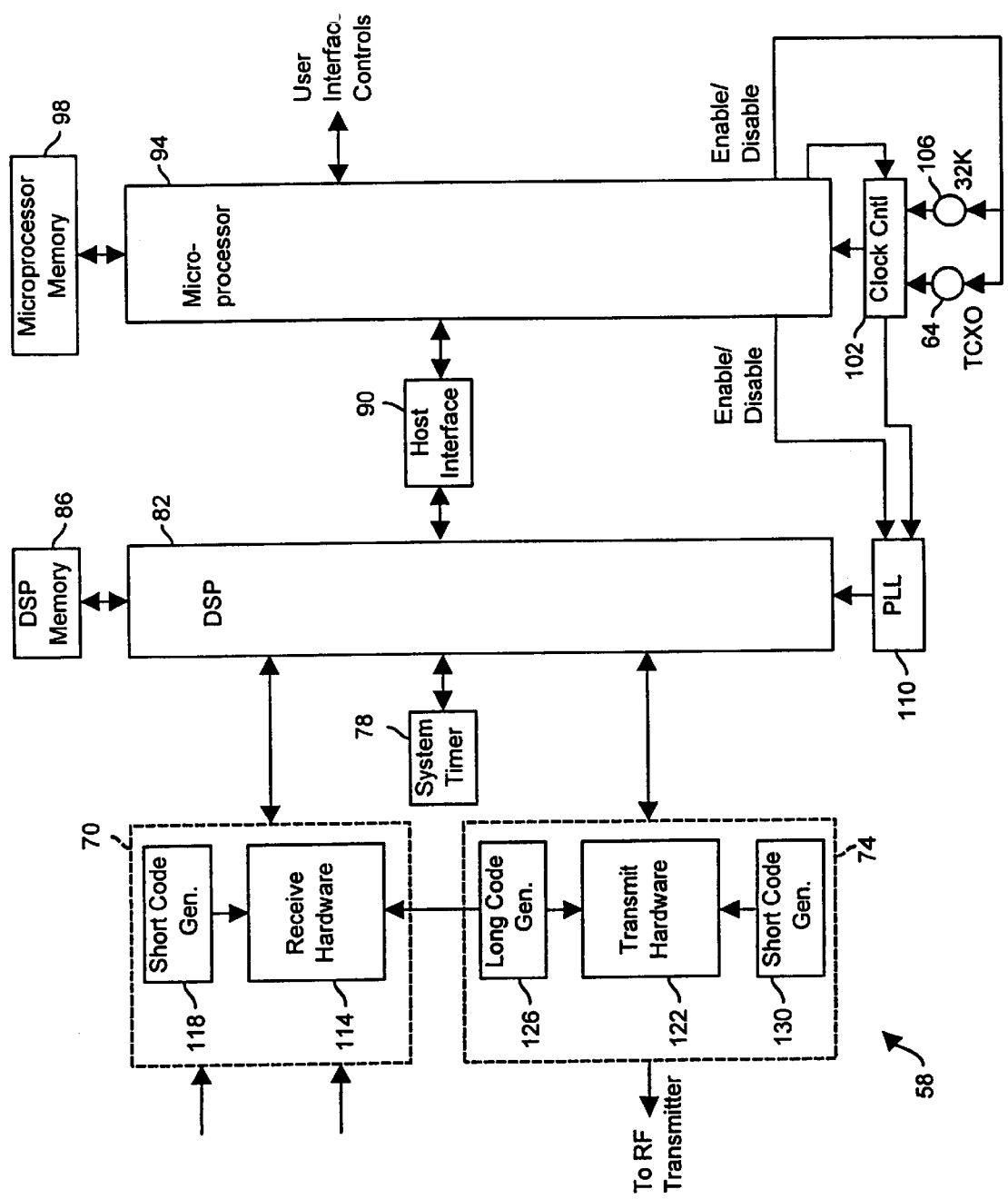
FIG. 4 is a detailed block diagram of the baseband processor of FIG. 3.

As shown in FIG. 4, the baseband processor 58 may include a receiver 70, a transmitter 74 and a system timer 78, each of which may be coupled to a DSP 82. The receiver 70 and the transmitter 74 perform the functions of providing signals to and receiving signals from the DSP 82, respectively. The system timer 78 maintains system timing and synchronization for the baseband processor 58 and provides the system timing to the DSP 82.

The DSP 82 may also be coupled to a DSP memory 86 and a host interface 90, which may be further coupled to a microprocessor 94 having a microprocessor memory 98. The DSP memory 86 and the microprocessor 98 may be integrated with or separate from the DSP 82 and the microprocessor 94, respectively. As will be appreciated by those having ordinary skill in the art, the DSP and microprocessor memories 86, 98 may be read only memory (ROM), random access memory (RAM) or any suitable combination thereof. Either way, the DSP and microprocessor memories 86, 98 are adapted to store instructions that may be executed by the DSP 82 and the microprocessor 94.

Additionally, the baseband processor 58 may include a clock controller 102 coupled to a 32 kilohertz (KHz) clock source 106, the TCXO 64 and the microprocessor 94. A PLL 110 may be coupled between the clock controller 102 and the DSP 82. The microprocessor 94 is adapted to selectively enable and disable the TCXO 64 and the 32 KHz clock source 106. The microprocessor 94 also controls the output of the clock controller 102 to determine which of the TCXO 64 or the 32 KHz clock source 106 is coupled to the microprocessor 94 and the PLL 110. The PLL 110 receives and upconverts the output of the clock controller 102 to provide a signal source to the DSP 82.

The receiver 70 may include receive hardware 114 and a short code generator 118. The transmitter 74 may include transmit hardware 122 that may be coupled to a long code generator 126 and a short code generator 130. The short code generator 118 and the long code generator 126 generate short and long codes, respectively, that are synchronized to the base station 12 with which the mobile unit 14 is communication or from which the mobile unit 14 expects to receive communication. Note that the long code generator 126, while it is part of the transmitter 74, is also coupled to the receive hardware 114 of the receiver 70. The transmitter 70 is further coupled to an RF transmitter (not shown).

Upon receiving the quadrature and in-phase data from the mixed signal device 56, the receive hardware 114 compares the received data to the state of the short code generator 118 and the long code generator 126 to ensure that the data was received from the appropriate CDMA base station 12 and to ensure that the data received by the mobile unit 14 is intended for the mobile unit 14. If both the short and long codes do not match the short and long codes used to encode the data received by the mobile unit 14, the receive hardware 114 discards the data provided to it from the mixed signal device 56. If, however, the short and long codes in the received data match the short and long codes provided by the short code generator 118 and the long code generator 126, the data from the mixed signal device 56 is coupled to the DSP 82, which appropriately processes the received data.

The microprocessor 94 controls the functionality of the mobile unit 14. In one particularly interesting aspect of its operation, the microprocessor 94 may execute instructions or routines stored in the microprocessor memory 98 to control the DSP 82 to conserve battery life by entering a sleep mode. The microprocessor 94 may also control user interface functions such as reading a dialing keypad or providing feedback to a user, via a liquid crystal display (LCD) or a light emitting diode (LED) display. The microprocessor 94 controls the DSP 82 via the host interface 90, which may bridge a communication gap between the DSP 82 and the microprocessor 94.

Having generally outlined the functionality of the components of the baseband receiver 58, attention is turned to how these components operate as the baseband processor 58 transitions from awake mode into sleep mode and how these components cooperate to enable the baseband processor 58, in particular, and the CDMA receiver 40, in general, to recognize and receive communications during assigned paging slots 22 while disabling the TCXO 64 to lower current drain during unassigned paging slots 24. Detail regarding the operation of the baseband processor 58 is given in below conjunction with FIGS. 5–9.

The advantages of disabling the TCXO 64 will be readily appreciated by those having ordinary skill in the art. During time periods not falling within the assigned paging slots 22, various components of the CDMA receiver 40 may be powered down to minimize current drain and to lengthen the battery life of the mobile unit 14. Table 1 below illustrates exemplary currents, in milliamperes (mA), for various components of the CDMA receiver 40 based on whether the CDMA receiver 40 is in an assigned paging slot 22 or in an unassigned paging slot 24. Of particular interest in Table 1 is the current drain value associated with the TCXO 64. While foregoing systems have been known to place various components of the CDMA receiver 40 in low power modes (also called sleep modes) during unassigned paging slots 24, no known systems have powered down the TXCO 64 during unassigned paging slots 24. Accordingly, prior systems have had, for example, a 1.5–2.5 mA current drain from TCXO 64 during the unassigned paging slots 24. As can be appreciated by examining the far right column of Table 1, a TCXO 64 current drain of 1.5–2.5 mA would be many times the largest contributor of unassigned paging slot current drain. Accordingly, the advantages of disabling the TCXO 64 during unassigned paging slots 24 can be readily appreciated.

TABLE 1

| CDMA Receiver Component | assigned paging slot current drain (mA) | unassigned paging slot current drain (mA) |
| --- | --- | --- |
| Down Converter 50 | 40 | 0.012 |
| UHF Synthesizer 60 | 10.5 | 0.001 |
| Demodulator 54 | 14 | 0.05 |
| Mixed Signal Device 56 | 18 | 0.85 |
| Baseband Processor 58 | 28 | 0.2 |
| TCXO 64 | 1.5–2.5 | 0 |

While it is advantageous to disable the TCXO 64 during unassigned paging slots 24 so as to reduce current drain, prior known systems have not done so because the TCXO 64 drives the DSP 82, which controls the code generators 118, 126, 130. In prior systems, the code generators 118, 136, 130 ensure that the mobile unit 14 receives accurate data from the CDMA base station 12 by staying in synchronization with the code generators disposed in the CDMA base station 12 even if the mobile unit 14 was in sleep mode, because the TCXO 64 was never powered down. The long code generator in the CDMA base station 12 is used to spread data at a rate of 1,228,800 bits (chips) per second. The long code generators of the mobile unit 14 and the CDMA base station 12 must be synchronized within one chip for the mobile unit 14 to receive the proper data from the CDMA base station 12. In prior systems, stopping the TCXO 64, which stops the code generators 118, 126, 130 in the mobile unit 14, would cause the CDMA receiver 40 to lose synchronization with the CDMA base station 12. The process during which, in accordance with the teachings herein, the mobile unit 14 goes to sleep and turns off the TCXO 64 is described in conjunction with FIGS. 5–7.

When the CDMA receiver 40 sets up for an assigned paging slot 22 within the system of FIG. 3, the TCXO 64 must power up and the CDMA receiver 40 must synchronize its code generators 118, 126, 130 to the code generators in the CDMA base station 12. The process during which, in accordance with the teachings herein, the mobile unit 14 awakens from sleep mode is described in conjunction with FIGS. 5, 8 and 9.

Figure 5:
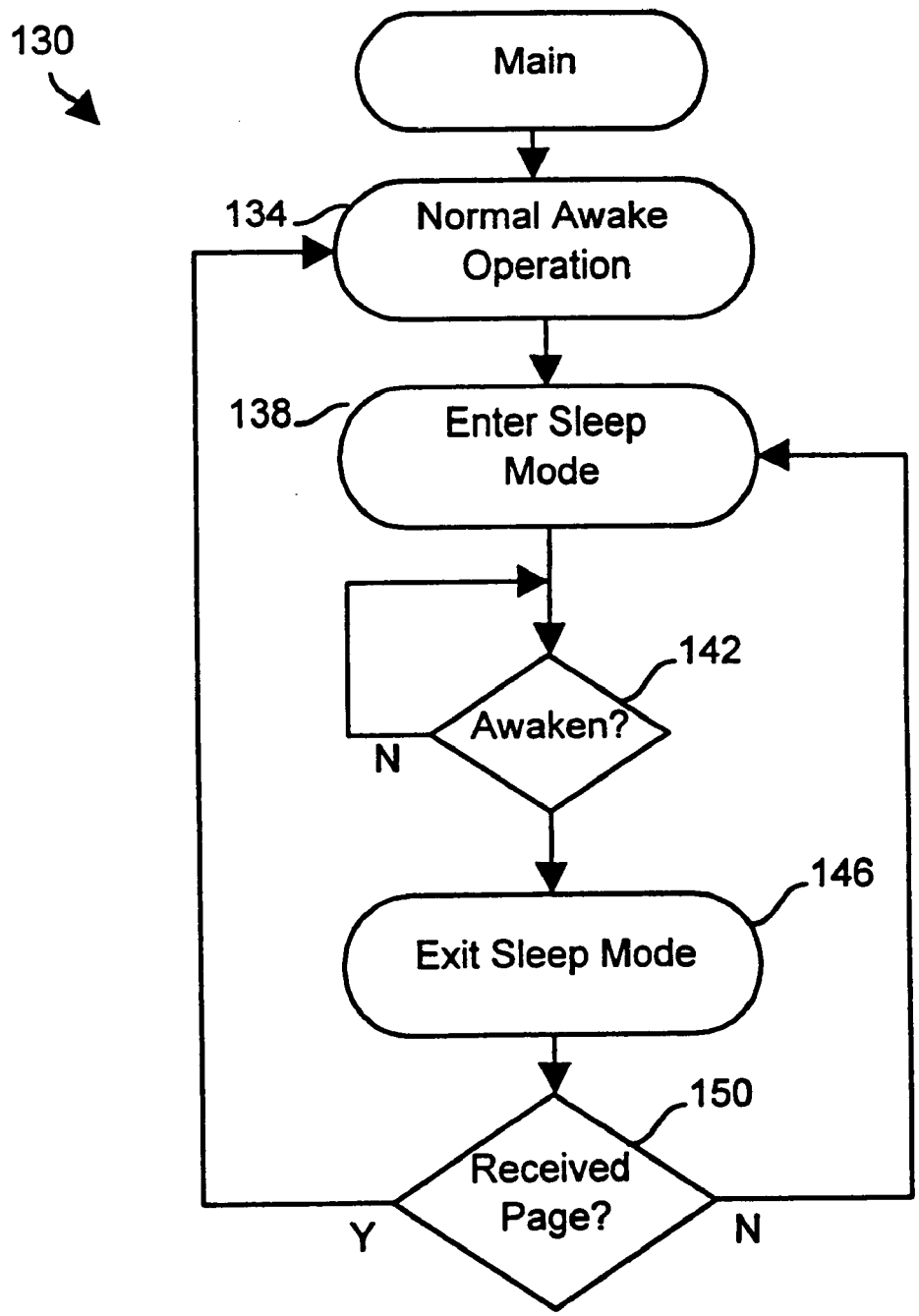
FIG. 5 is a flow diagram of a main process that may be carried out by the microprocessor of FIG. 4.

FIG. 5 illustrates a main process 130 having a number of steps that may be carried out by the microprocessor 94. Some of the steps of the main process 130 may be subroutines, the details of which are shown in FIGS. 6–9. A computer program representing these steps and subroutines may be stored in the microprocessor memory 98, which may be separate from the microprocessor 94 or may be integrated therewith. The computer program may be written using any suitable computer language such as any version of C, a suitable assembly language or machine code, any of which may be compiled into a form suitable for execution by the microprocessor 94.

The main process 130 executed by the microprocessor 94 may include a state of normal awake operation 134 during which the mobile unit 14 is awake and operating. During the normal awake operation 134 the microprocessor 94 or the DSP 82 periodically stores the long codes and short codes generated by the code generators 118, 126 and 130. Additionally, during normal awake operation 134, the microprocessor 94 or the DSP 82 stores a base station PN offset code indicative of the base station with which the mobile unit may communicate. At some point during normal awake operation 134, the mobile unit 14 may enter sleep mode. The microprocessor 94 may control the mobile unit 14 to enter sleep mode when the mobile unit 14 is not in use. When the microprocessor 94 desires to enter sleep mode, the microprocessor 94 executes an enter sleep mode process 138, further detail of which is provided in FIG. 6.

Figure 8:
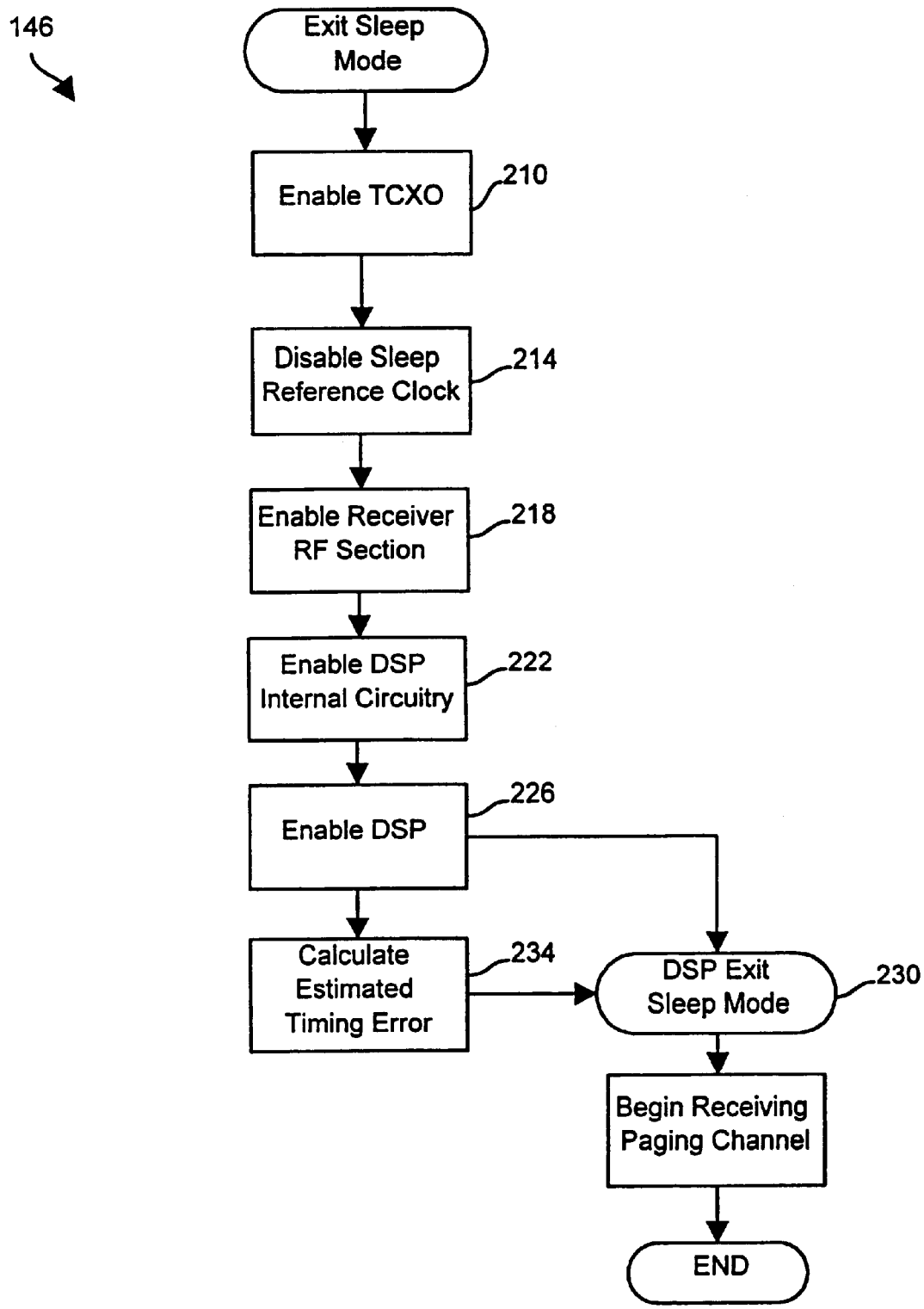
FIG. 8 is a flow diagram of an exit sleep mode process that may be carried out by the microprocessor of FIG. 4.

At some point when the mobile unit 14 is in sleep mode, the mobile unit will awaken. Step 142 determines if the mobile unit 14 should awaken from sleep mode. The microprocessor 94 may generate an interrupt to cause step 142 to recognize the need to awaken. If step 142 determines that the mobile unit 14 should not awaken, program control remains at step 142. However, if step 142 determines that the mobile unit 14 should awaken, control passes from step 142 to an exit sleep mode process 146, the details of which are shown in FIG. 8. After the exit sleep mode process 146 is complete, step 150 checks to see if a page was received in the paging slot of the mobile unit 14. If a page was received, control passes from step 150 to normal awake operation 134. If, however, a page was not received, control passes from step 150 to the enter sleep mode process 138, which causes the mobile unit 14 to return to sleep.

Of particular interest is the fact that step 150 is able to determine the presence or absence of a page without waiting for the entire 80 ms paging slot to complete. Rather, at step 150 the microprocessor 94 examines approximately the first 20 ms of the paging slot and, based on that examination makes a determination of whether the mobile unit should return to sleep. Accordingly, extended battery life is realized because the mobile unit 14 may return to sleep faster than waiting for the entire 80 ms paging channel to complete.

Figure 6:
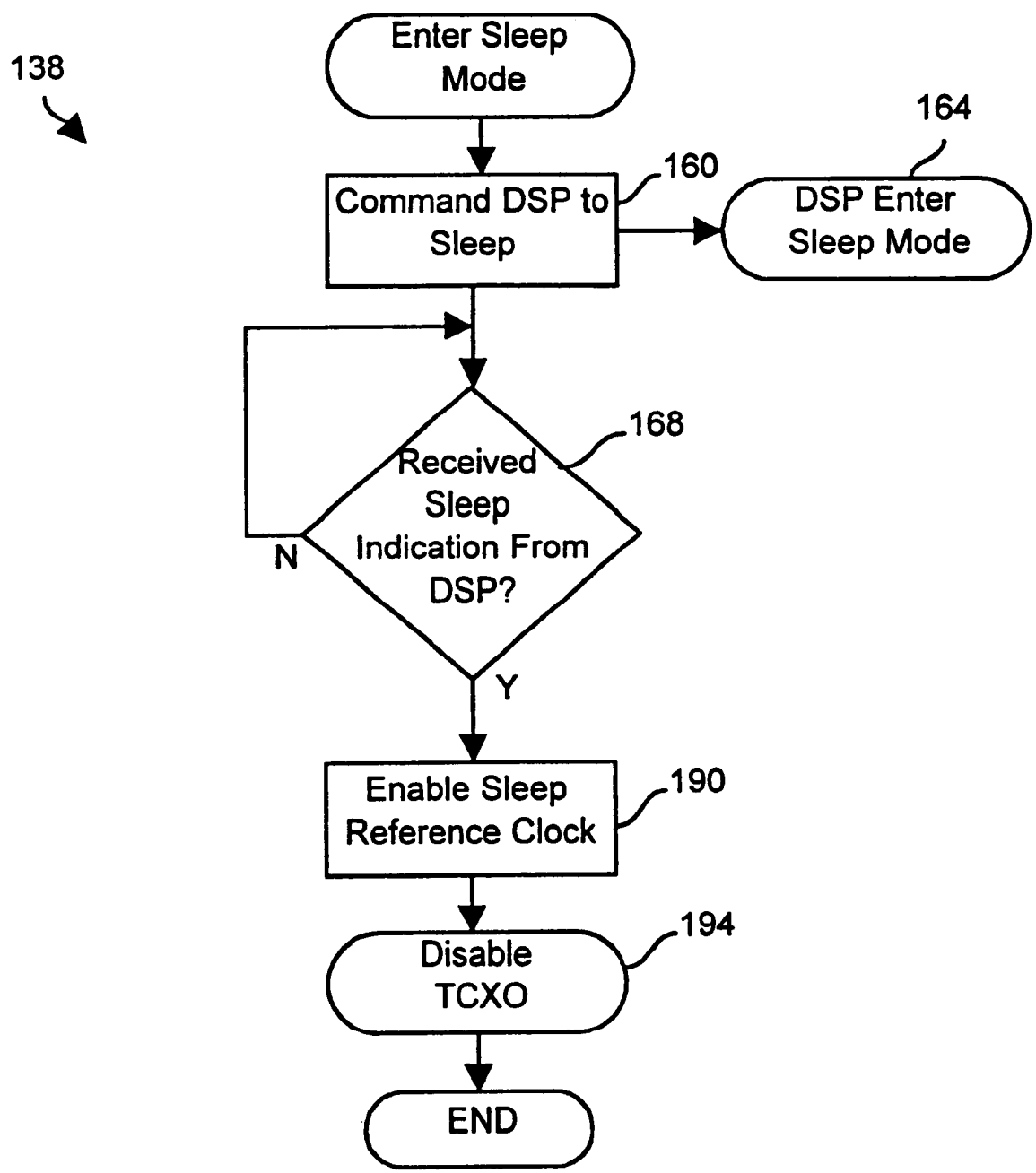
FIG. 6 is a flow diagram of an enter sleep mode process that may be carried out by the microprocessor of FIG. 4.

As shown in FIG. 6, the enter sleep mode process 138, which is executed by the microprocessor 94, causes the microprocessor 94 to interact with the DSP 82 to cause the mobile unit 14 to enter sleep mode. At step 160, the microprocessor 94 commands the DSP to enter sleep mode, which causes a DSP enter sleep mode process 164 to be executed by the DSP 82. After step 160 is complete and the microprocessor 94 has caused the DSP 82 to begin execution of the DSP enter sleep mode process 164, step 168 waits for the microprocessor 94 to receive a sleep indication from the DSP 82.

Figure 7:
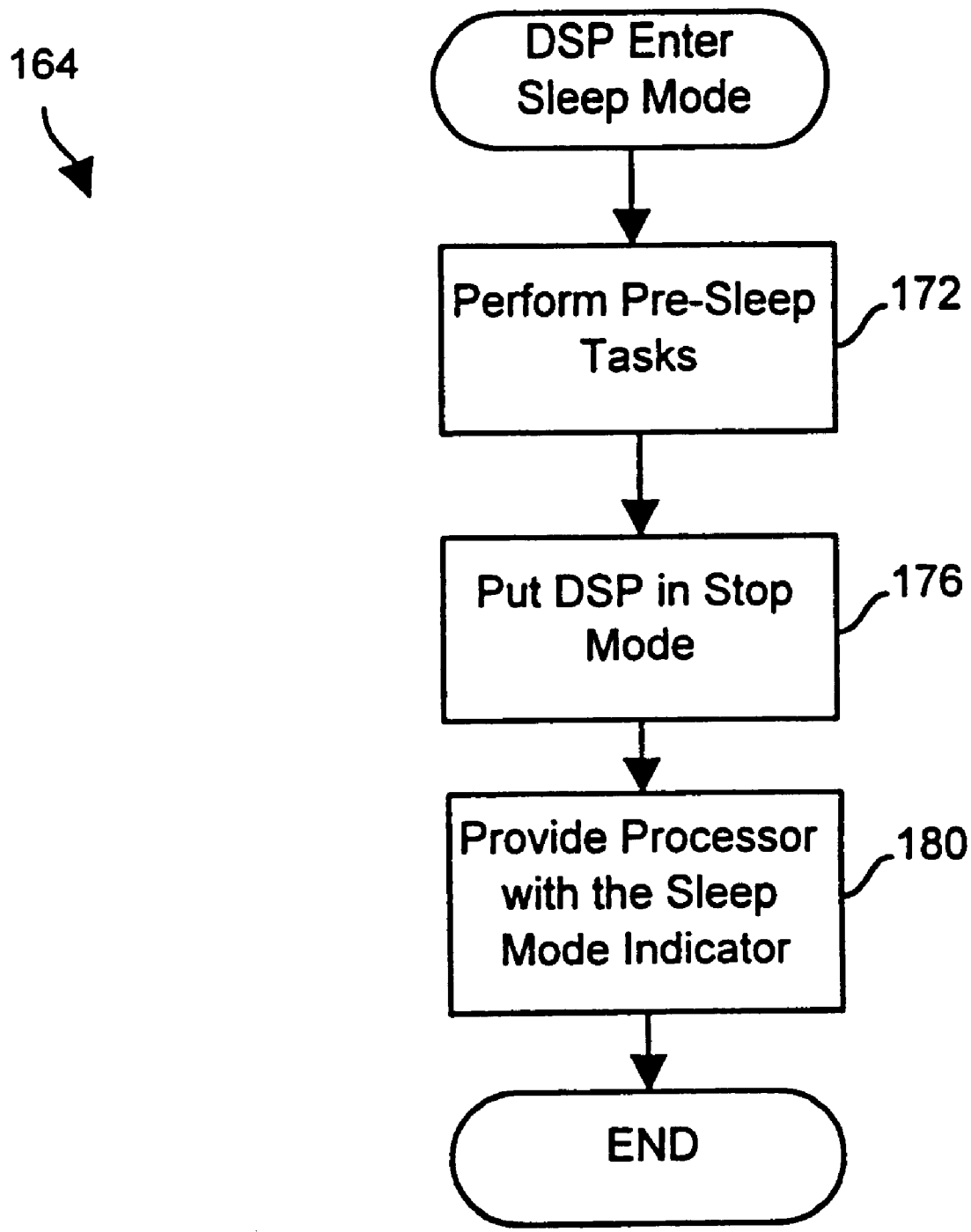
FIG. 7 is a flow diagram of a digital signal processor (DSP) enter sleep mode process that may be carried out by the DSP of FIG. 4.

Turning now to FIG. 7, the operation of the DSP enter sleep mode process 164 and the generation of the sleep indication by the DSP 82, on which step 168 of the enter sleep mode process 138 depends, will be explained. The DSP enter sleep mode process 164 is executed by the DSP 82. Instructions representing the steps of the process may be stored in the DSP memory 86 and loaded into the DSP 82 for execution. At step 172, the DSP 82 performs pre-sleep tasks in preparation for the DSP 82 to be put to sleep. Pre-sleep tasks may include storing the state of various registers, storing the state of the code generators 118, 126, 130 and performing other computational tasks. After the pre-sleep tasks have been completed, step 176 puts the DSP 82 is stop mode, which is a mode in which the DSP 82 draws very low current. The step 180 then provides from the DSP 82 an indication to the microprocessor 94 that the DSP 82 has been placed in sleep mode. It is this indication that step 168 of the enter sleep mode process 138 awaits.

Returning to FIG. 6, after step 168 determines that the microprocessor 94 has received a sleep indication from the DSP 82, step 190 enables a sleep reference clock, which may be the 32 KHz clock 106. After step 190 is complete, step 194 disables the TCXO 64. It is the disabling of the TCXO 64 during sleep mode that allows the mobile unit 14 to enjoy the 1.5–2.5 mA current savings noted hereinbefore.

Having described the enter sleep mode process 138 in detail, attention will now be turned to the exit sleep mode process 146, which will be described in conjunction with FIGS. 8 and 9. Referring now to FIG. 8, after the exit sleep mode process 146 is begun, step 210 enables the TCXO 64 and passes control to step 214. Step 214 disables the sleep reference clock, which may be the 32 KHz clock 106 (FIG. 4). Step 218 enables the RF section of the receiver, which may include the LNA 46, the down converter 50 and the demodulator 54, all of which are shown in FIG. 3.

After step 218 is complete, step 222 enables internal circuitry of the DSP 82. Step 222 may also include enabling the PLL 110 and coupling the TCXO 64 to the PLL 110, via the clock controller 102. At step 226 the microprocessor 94 enables the DSP 82. After the DSP 82 is enabled, a DSP exit sleep mode process 230 is executed by the DSP 82. Further detail regarding the DSP exit sleep mode process 230 will be described below with respect to FIG. 9.

While the DSP 82 is performing the DSP exit sleep mode process 230, the microprocessor 94 calculates, at step 234, the estimated timing error that occurred while the mobile unit 14 was asleep. The estimated timing error is dependent on both the duration of time during which the mobile unit 14 was asleep (e.g., dependent on the slot cycle index) and the tolerance or jitter of the sleep reference clock, which may be the 32 KHz clock 106 (FIG. 4). In particular, the error depending on the duration of sleep time (e.g., the slot cycle index) includes propagation delay and multipath fading. The error (in chips) due to propagation delay may be calculated according to Equation 1.

$$c = \frac{4.096 \times v \times 1.28 \times 2^i}{3600} \qquad \text{Equation 1}$$

Wherein, c is the error in chips, v is the vehicle speed in kilometers per hour (kmph) and i is the slot cycle index.

Multipath fading may contribute an error of as much as 32 chips, depending on the channel characteristics at the time of communication. The timing error due to sleep time is dictated by the precision of the oscillator (e.g., the 32 KHz clock source 106, shown in FIG. 4). For example, if the 32 KHz clock source 106 has 100 parts per million (PPM) precision, the timing error will be greater than if the 32 KHz clock source 106 has 40 PPM precision.

In one embodiment, estimated error may be stored in a lookup table based on slot cycle index, because propagation, fading and clock jitter may play different roles in the estimated error based on the slot cycle index. As will be discussed below in conjunction with the DSP exit sleep mode process 230, the estimated error will be advantageously used by the DSP 82 to reduce the PN space that the DSP 82 searches to synchronize itself with the CDMA base station 12.

Figure 9:
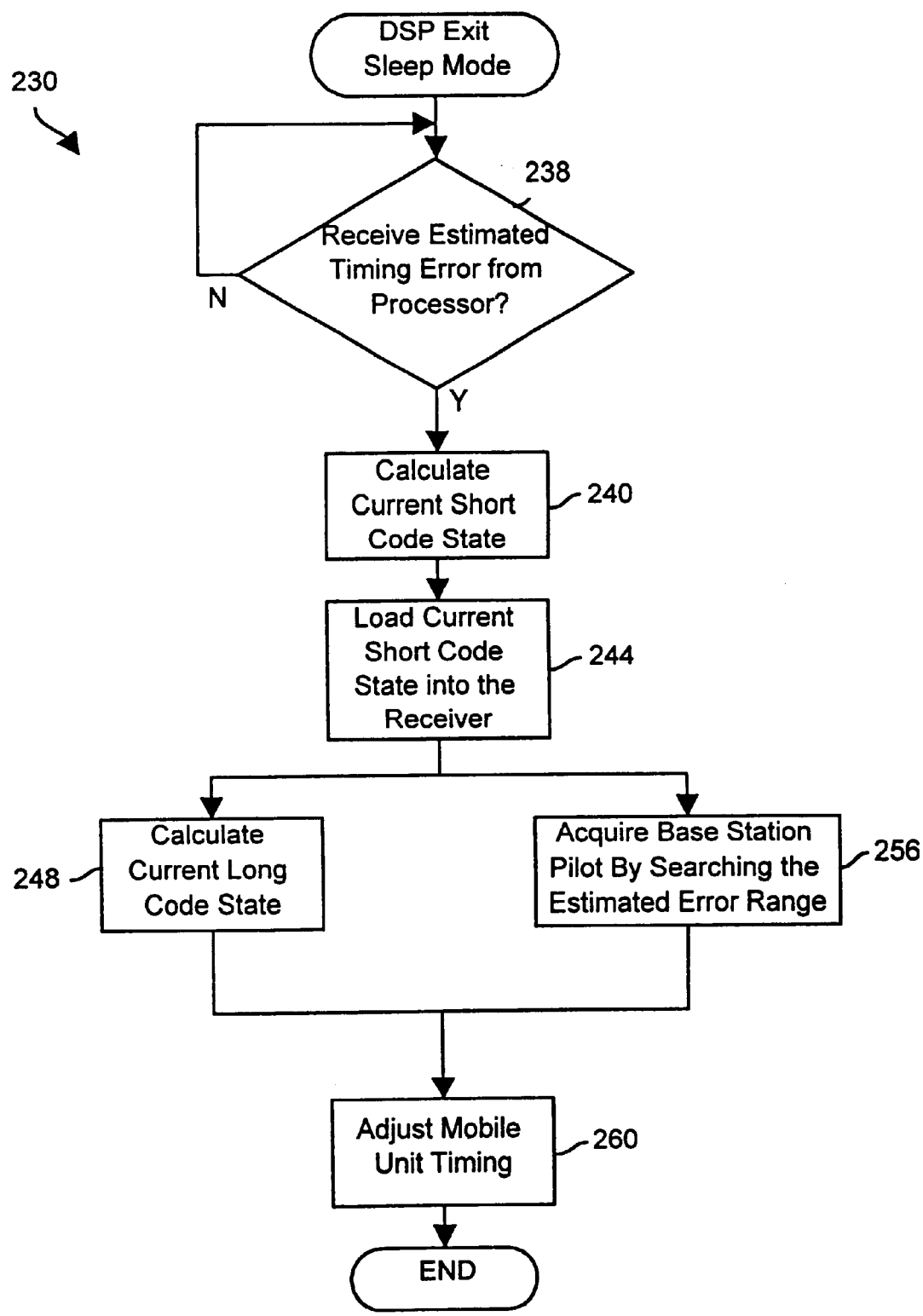
FIG. 9 is a flow diagram of a DSP exit sleep mode process that may be carried out by the DSP of FIG. 4.

Referring now to FIG. 9, the DSP exit sleep mode process 230 begins at step 238 which waits for the microprocessor 94 to supply to the DSP 82 the estimated error calculated at step 234 of the exit sleep mode process 146, shown in FIG. 8. Until the DSP 82 receives the estimated error, the DSP exit sleep mode process 230 waits at step 238. When the DSP 82 receives the estimated error from the microprocessor 94, control passes from step 238 to step 240.

At step 240, the DSP 82 calculates the current short code state. This step is necessary because the TCXO 64 was disabled while the mobile unit 14 was in sleep mode. Step 240 is carried out by retrieving the short code that was stored before the mobile unit 14 went to sleep and, based on that stored short code, calculating the current short code. Because the short code rolls over every 26.66 ms, the short code is an integral multiple of the sleep time. The DSP 82 knows how long it was asleep and therefore can calculate the current short code by multiplying the stored short code by the number of 20 ms time periods that elapsed while the short code generators 118, 130 were disabled. After the current short code is calculated at step 240, control passes to step 244, which loads the current short code state into the short code generator 18 in the receiver 70.

After the short code state has been calculated and loaded, step 248 calculates what the long code state would be had the TCXO 64 not been stopped while the mobile unit 14 was asleep. The DSP 82 calculates the current long code state by multiplying the long code state that was stored by the DSP 82 before it went to sleep by a transformation matrix (T) raised to the k power, wherein k is the number of states or frames that have elapsed since the long code state was stored. For example, in the slotted paging mode illustrated in FIG. 2, which has a 1.28 s period, k would be equal to 64 (i.e., 1.28 s/20 ms per frame). Accordingly, for the slotted paging mode illustrated in FIG. 2, the current long code state would be calculated by multiplying the stored long code by $T^{64}$. The transformation matrix, T, is shown in Equation 2 below. In Equation 2, m is the degree of a polynomial representing the long code generator 126, and $g_m$ is the $m^{th}$ output bit of the shift register. In practice, transformation matrices, such as the one shown in Equation 2, may be precomputed and stored in the DSP memory 86 to eliminate the calculation overhead associated with generating transformation matrices for advancing the long code state by 20 ms and 80 ms time periods.

$$T = \begin{bmatrix} 0 & 0 & \ldots & 0 & 0 & 0 & 1 \\ 1 & 0 & \ldots & 0 & 0 & 0 & g_1 \\ 0 & 1 & \ldots & 0 & 0 & 0 & g_2 \\ \vdots & \vdots & \vdots & \vdots & \vdots & \vdots & \vdots \\ 0 & 0 & \ldots & 1 & 0 & 0 & g_{m-3} \\ 0 & 0 & \ldots & 0 & 1 & 0 & g_{m-2} \\ 0 & 0 & \ldots & 0 & 0 & 1 & g_{m-1} \end{bmatrix}^{24,576} \quad \text{Equation 2}$$

While step 248 calculates the current long code state from the stored long code state, at step 256 the DSP 82 acquires the base station pilot tone by searching a range of PN space equivalent to two times the estimated error received from the microprocessor 94. For example, if the estimated error is 10 chips, the DSP 82 will search for the pilot from the base station at the short code and continue to search while advancing the short code up to 10 chips. If the pilot is not found, the DSP 82 may search for the pilot at the short code and continue to search while retarding the short code up to 10 chips.

After steps 248 and 256 are complete and the mobile unit has acquired the base station pilot, step 260 adjusts the mobile unit timing based on the arrival time of the first multipath component of the pilot and the base station offset that was stored by the DSP 82. Adjusting the timing of the mobile unit consists of advancing or retarding the timing of the code generators 118, 126, 130 and the system timer 78.

Figure 10:
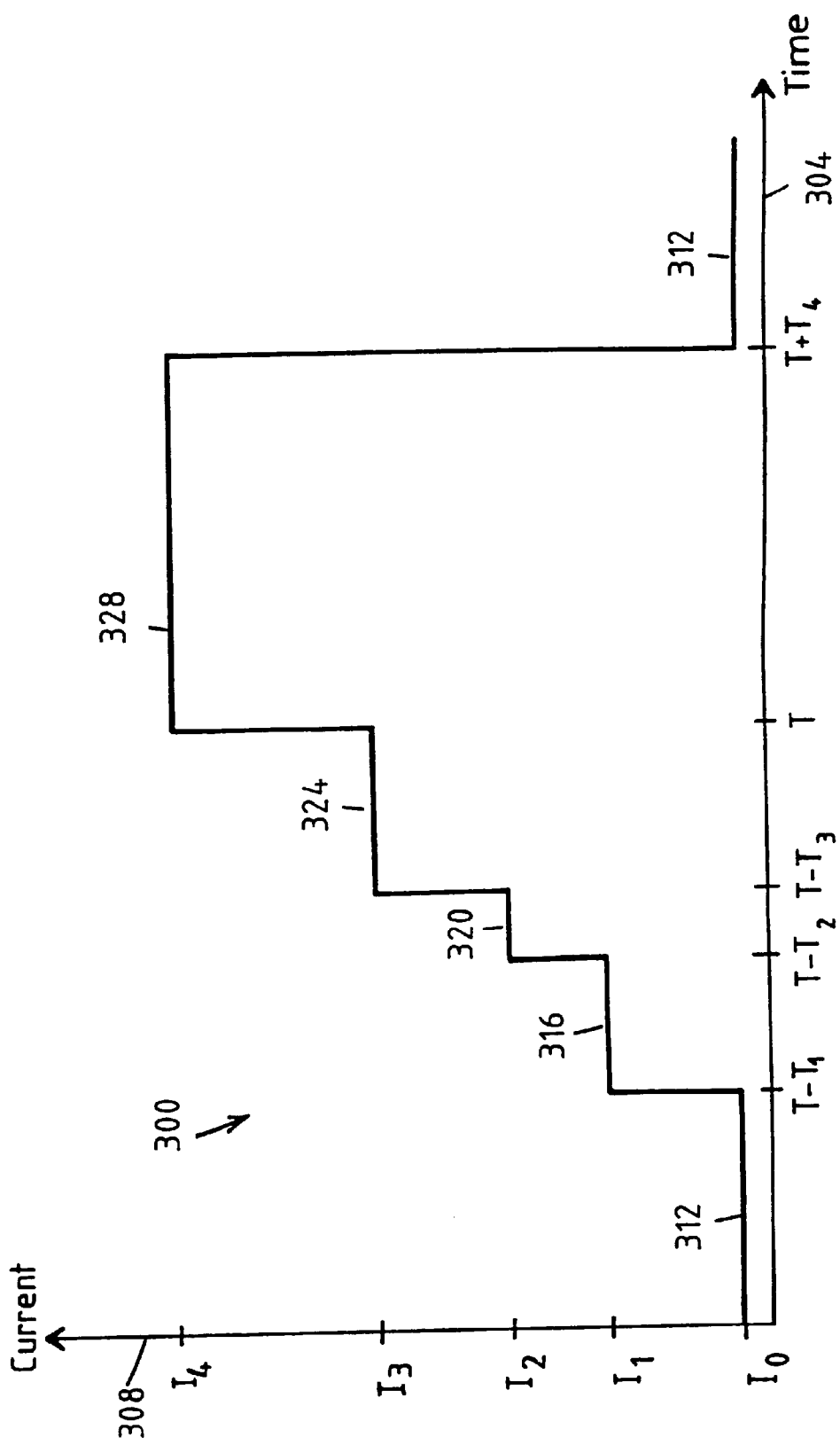
FIG. 10 illustrates a current usage profile of a mobile unit employing the techniques disclosed herein.

Referring to FIG. 10, a mobile unit current profile 300 includes a time axis 304 and a current drain axis 308. The mobile unit 14 has five operating states 312–328. The inactive state 312 is a state in which the TCXO 64 is disabled and the current drain for the mobile unit 14 may be, for example, 1.7 mA. In previous systems, current drain in the inactive state 312 was, for example, 3.2 mA due to the fact that the TCXO 64 was not previously disabled and was drawing, for example, 1.5–2.5 mA.

The oscillator setup mode 316 is a mode in which the UHF synthesizer 60 is powered up. The current drain in the oscillator setup mode 316 may be, for example, 21.7 mA, due to the current drains of the UHF synthesizer 66, the TXCO 64 and the demodulator 54.

The receive power up mode 320 may have a current drain of, for example, 84.8 mA, due to the current drains of the UHF synthesizer 60, the TXCO 64, the demodulator 54, the down converter 50 and the mixed signal device 56. During the reacquisition mode 324, the current drain of the baseband processor 58 adds to the current drain in the receive power up mode 320, resulting in, for example, a 103.5 mA current drain for the reacquisition mode.

The active paging slot mode 328, which has the highest current drain of any mode at, for example, 113.5 mA, has a current drain higher than the reacquisition mode 324 due to increased current consumption of the baseband processor 58.

From the foregoing description of FIG. 10, it is most important to recognize the small amount of current consumed by the mobile unit 14 during the inactive state 312, wherein the TCXO 64 is disabled. Prior systems did not disable the TCXO 64 and, therefore, could not achieve the low current consumption in the inactive state 312.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

What is claimed is:

1. A method of reducing current consumption in a mobile communication unit having an oscillator driving a first pseudorandom code generator, wherein the mobile communication unit is adapted to communicate with a base station having a second pseudorandom code generator, the method comprising the steps of:

storing a first state of the first pseudorandom code generator that is substantially synchronized to the second pseudorandom code generator at a first time;

entering a sleep mode for a predetermined period of time during which the oscillator and the first pseudorandom code generator are stopped;

entering an awake mode wherein the oscillator and the first pseudorandom code generator are started;

calculating a second state of the first pseudorandom code generator that is substantially synchronized to the second pseudorandom code generator at a second time, wherein the second state of the first pseudorandom code generator is calculated based on the first state of the first pseudorandom code generator;

determining an estimated error between the second state of the first pseudorandom code generator and a state of the second pseudorandom code generator at the second time; and searching a range of pseudorandom noise (PN) states dependent on the estimated error between the second state of the first pseudorandom code generator and the state of the second pseudorandom code generator at the second time to synchronize the first pseudorandom code generator to the second pseudorandom code generator.

2. The method of claim 1, further comprising the step of updating the first pseudorandom code generator to the second state, thereby substantially synchronizing the first pseudorandom code generator with the second pseudorandom code generator at the second time.

3. The method of claim 1, wherein the step of calculating the second state of the first pseudorandom code generator comprises multiplying the first state by a transformation matrix.

4. The method of claim 1, wherein the step of entering the sleep mode for the predetermined period of time comprises entering the sleep mode for approximately 1.28 seconds.

5. The method of claim 1, wherein the step of entering the sleep mode for the predetermined period of time comprises entering the sleep mode for approximately 2.56 seconds.

6. The method of claim 1, wherein the step of entering the awake mode comprises entering the awake mode for approximately 20 milliseconds to determine if a page is received from the base station.

7. The method of claim 6, further comprising the step of returning to the sleep mode if no page is received from the base station at the mobile unit.

8. The method of claim 1, wherein the step of determining an estimated error comprises determining an estimated error based on a slot cycle index.

9. The method of claim 1, wherein the step of determining an estimated error comprises determining an estimated error based on jitter of a sleep reference clock.

10. The method of claim 1, wherein the step of determining an estimated error comprises determining an estimated error based on propagation delay and multipath fading.

11. A method of reducing current consumption in a mobile communication unit having an oscillator driving a first code generator, wherein the mobile communication unit is adapted to communicate with a base station having a second code generator, the method comprising the steps of:

storing a first state of the first code generator that is substantially synchronized to the second code generator at a first time;

entering a sleep mode for a predetermined period of time during which the oscillator and the first code generator are stopped;

entering an awake mode wherein the oscillator and the first code generator are started;

calculating a second state of the first code generator that is substantially synchronized to the second code generator at a second time by multiplying the first state by a transformation matrix wherein the second state of the first code generator is calculated based on the first state of the first code generator;

determining an estimated error between the second state of the first code generator and a state of the second code generator at the second time; and searching a range of pseudorandom noise (PN) states dependent on the estimated error between the second state of the first code generator and the state of the second code generator at the second time to synchronize the first code generator to the second code generator by searching a range two times the estimated error.

12. A current consumption reduction system for use in a mobile communication unit having a processor and an oscillator driving a first pseudorandom code generator, wherein the mobile communication unit is adapted to communicate with a base station having a second pseudorandom code generator, the current consumption reduction system comprising:

a memory;

instructions stored by the memory and adapted for execution by the processor, wherein the execution of the instructions causes the processor to perform the steps of:

storing a first state of the first pseudorandom code generator that is substantially synchronized to the second pseudorandom code generator at a first time;

entering a sleep mode for a predetermined period of time during which the oscillator and the first pseudorandom code generator are stopped;

entering an awake mode wherein the oscillator and the first pseudorandom code generator are started;

calculating a second state of the first pseudorandom code generator that is substantially synchronized to the second pseudorandom code generator at a second time, wherein the second state of the first pseudorandom code generator is calculated based on the first state of the first pseudorandom code generator;

determining an estimated error between the second state of the first code pseudorandom generator and a state of the second pseudorandom code generator at the second time; and searching a range of pseudorandom noise (PN) states dependent on the estimated error between the second state of the first pseudorandom code generator and the state of the second pseudorandom code generator at the second time to synchronize the first pseudorandom code generator to the second pseudorandom code generator.

13. The system of claim 12, wherein the processor is further programmed to perform the step of updating the first pseudorandom code generator to the second state, thereby substantially synchronizing the first pseudorandom code generator with the second pseudorandom code generator.

14. The system of claim 12, wherein when the processor performs the step of calculating the second state of the first pseudorandom code generator, the processor multiplies the first state by a transformation matrix.

15. The system of claim 12, wherein the step of entering the sleep mode for the predetermined period of time comprises entering the sleep mode for approximately 1.28 seconds.

16. The system of claim 12, wherein the step of entering the sleep mode for the predetermined period of time comprises entering the sleep mode for approximately 2.56 seconds.

17. The system of claim 12, wherein the step of entering the awake mode comprises entering the awake mode for approximately 20 milliseconds to determine if a page is received from the base station.

18. The system of claim 17, wherein the processor is further programmed to return to sleep mode if no page is received.

19. The system of claim 12, wherein the step of determining an estimated error comprises determining an estimated error based on a slot cycle index.

20. The system of claim 12, wherein the step of determining an estimated error comprises determining an estimated error based on jitter of a sleep reference clock.

21. The system of claim 12, wherein the step of determining an estimated error comprises determining an estimated error based on propagation delay and multipath fading.

22. A current consumption reduction system for use in a mobile communication unit having a processor and an oscillator driving a first code generator, wherein the mobile communication unit is adapted to communicate with a base station having a second code generator, the current consumption reduction system comprising:
　a memory;
　instructions stored by the memory and adapted for execution by the processor, wherein the execution of the instructions causes the processor to perform the steps of:
　　storing a first state of the first code generator that is substantially synchronized to the second code generator at a first time;
　　entering a sleep mode for a predetermined period of time during which the oscillator and the first code generator are stopped;
　　entering an awake mode wherein the oscillator and the first code generator are started;
　　calculating a second state of the first code generator that is substantially synchronized to the second code generator at a second time, wherein the second state of the first code generator is calculated based on the first state of the first code generator by multiplying the first state by a transformation matrix;
　　determining an estimated error between the second state of the first code generator and a state of the second code generator at the second time;
　　searching a range of pseudorandom noise (PN) states dependent on the estimated error between the second state of the first code generator and the state of the second code generator to synchronize the first code generator to the second code generator at the second time by searching a range two times the estimated error.

23. A current consumption reduction system for use in a communication unit having a processor and an oscillator driving a first pseudorandom code generator, wherein the mobile communication unit is adapted to communicate with a base station having a second pseudorandom code generator, the current consumption reduction system comprising:
　a memory;
　a first software routine stored on the memory and adapted to be executed by the processor to store a first state of the first pseudorandom code generator that is substantially synchronized to the second pseudorandom code generator at a first time;
　a second software routine stored on the memory and adapted to be executed by the processor to enter a sleep mode for a predetermined period of time during which the oscillator and the first pseudorandom code generator are stopped;
　a third software routine stored on the memory and adapted to be executed by the processor to enter an awake mode wherein the oscillator and the first pseudorandom code generator are started;
　a fourth software routine stored on the memory and adapted to be executed by the processor to calculate a second state of the first pseudorandom code generator that is substantially synchronized to the second pseudorandom code generator at a second time, wherein the second state is calculated based on the first state;
　a fifth software routine stored on the memory and adapted to be executed on the processor to determine an estimated error between the second state of the first pseudorandom code generator and a state of the second pseudorandom code generator at the second time; and
　a sixth software routine stored on the memory and adapted to be executed on the processor to search a range of pseudorandom noise (PN) states dependent on the estimated error between the second state of the first pseudorandom code generator and the state of the second pseudorandom code generator at the second time to synchronize the first pseudorandom code generator to the second pseudorandom code generator.

24. The system of claim 23, further comprising a seventh software routine stored on the memory and adapted to be executed on the processor to update the first pseudorandom code generator to the second state, thereby substantially synchronizing the first pseudorandom code generator with the second pseudorandom code generator at the second time.

25. The system of claim 24, wherein the fourth software routine multiplies the first state by a transformation matrix.

26. The system of claim 23, wherein the fifth software routine is stored on the memory and adapted to be executed on the processor to determine an estimated error based on a slot cycle index.

27. The system of claim 23, wherein the fifth software routine is stored on the memory and adapted to be executed on the processor to determine an estimated error based on jitter of a sleep reference cycle.

28. The system of claim 23, wherein the fifth software routine is stored on the memory and adapted to be executed on the processor to determine an estimated error based on propagation delay and multipath fading.

29. A current consumption reduction system for use in a mobile communication unit having an oscillator driving a first pseudorandom code generator, wherein the mobile communication unit is adapted to communicate with a base station having a second pseudorandom code generator, the current consumption reduction system comprising:

a logic device programmed to perform the steps of:

storing a first state of the first pseudorandom code generator that is substantially synchronized to the second pseudorandom code generator at a first time;

entering a sleep mode for a predetermined period of time during which the oscillator and the first pseudorandom code generator are stopped;

entering an awake mode wherein the oscillator and the first pseudorandom code generator are started;

calculating a second state of the first pseudorandom code generator that is substantially synchronized to the second pseudorandom code generator at a second time, wherein the second state of the first pseudorandom code generator is calculated based on the first state of the first pseudorandom code generator;

determining an estimated error between the second state of the first code pseudorandom generator and a state of the second pseudorandom code generator at the second time; and searching a range of pseudorandom noise (PN) states dependent on the estimated error between the second state of the first pseudorandom code generator and the state of the second pseudorandom code generator at the second time to synchronize the first pseudorandom code generator to the second pseudorandom code generator.

30. The system of claim 29, wherein the logic device is further programmed to perform the step of updating the first pseudorandom code generator to the second state, thereby substantially synchronizing the first code pseudorandom generator with the second pseudorandom code generator at the second time.

31. The system of claim 30, wherein when the logic device performs the step of calculating the second state of the first pseudorandom code generator, the logic device multiplies the first state by a transformation matrix.

32. A current consumption reduction system for use in a mobile communication unit having an oscillator driving a first code generator, wherein the mobile communication unit is adapted to communicate with a base station having a second code generator, the current consumption reduction system comprising:

a logic device programmed to perform the steps of:

storing a first state of the first code generator that is substantially synchronized to the second code generator at a first time;

entering a sleep mode for a predetermined period of time during which the oscillator and the first code generator are stopped;

entering an awake mode wherein the oscillator and the first code generator are started;

calculating a second state of the first code generator that is substantially synchronized to the second code generator at a second time, wherein the second state of the first code generator is calculated based on the first state of the first code generator by multiplying the first state by a transformation matrix;

updating the first code generator to the second state, thereby substantially synchronizing the first code generator with the second code generator at the second time;

determining an estimated error between the second state of the first code generator and a state of the second code generator at the second time;

searching a range of pseudorandom noise (PN) states dependent on the estimated error between the second state of the first code generator and the state of the second code generator at the second time to synchronize the second code generator by searching a range two times the estimated error.

33. A method of reducing current consumption in a mobile communication unit having an oscillator driving a first pseudorandom code generator, wherein the mobile communication unit is adapted to communicate with a base station having a second pseudorandom code generator, the method comprising the steps of:

storing a first state of the first pseudorandom code generator that is substantially synchronized to the second pseudorandom code generator at a first time;

entering a sleep mode for a predetermined period of time during which the oscillator and the first pseudorandom code generator are stopped;

entering an awake mode wherein the oscillator and the first pseudorandom code generator are started;

recalling the first state of the first pseudorandom code generator that is substantially synchronized to the second pseudorandom code generator at a first time; and calculating a second state of the first pseudorandom code generator that is substantially synchronized to the second pseudorandom code generator at a second time, wherein the second state of the first pseudorandom code generator is calculated based on the first state of the first pseudorandom code generator by multiplying the first state by a transformation matrix;

determining an estimated error between the second state of tie first pseudorandom code generator and a state of the second pseudorandom code generator at the second time; and searching a range of pseudorandom noise (PN) states dependent on the estimated error between the second state of the first pseudorandom code generator and the state of the second pseudorandom code generator at the second time to synchronize the first pseudorandom code generator to the second pseudorandom code generator.

34. The method of claim 33, further comprising the step of updating the first pseudorandom code generator to the second state, thereby substantially synchronizing the first pseudorandom code generator with the second pseudorandom code generator at the second time.

* * * * *

UNITED STATES PATENT AND TRADEMARK OFFICE
CERTIFICATE OF CORRECTION

PATENT NO. : 6,330,234 B1  
DATED : December 11, 2001  
INVENTOR(S) : Tomasi et al.

Page 1 of 1

It is certified that error appears in the above-identified patent and that said Letters Patent is hereby corrected as shown below:

<u>Column 18,</u>  
Line 41, "of tie" should be -- of the --.

Signed and Sealed this

Twenty-eighth Day of May, 2002

*Attest:*

JAMES E. ROGAN  
*Attesting Officer*  *Director of the United States Patent and Trademark Office*